March 20, 1962 W. M. SANDERSON 3,025,902
SAFETY TUBELESS TIRE CONSTRUCTION
Filed July 22, 1957
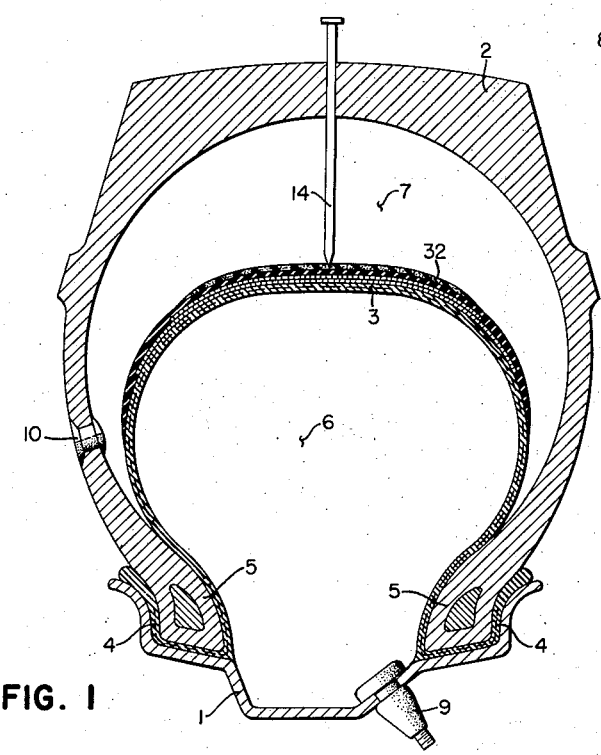
FIG. 1
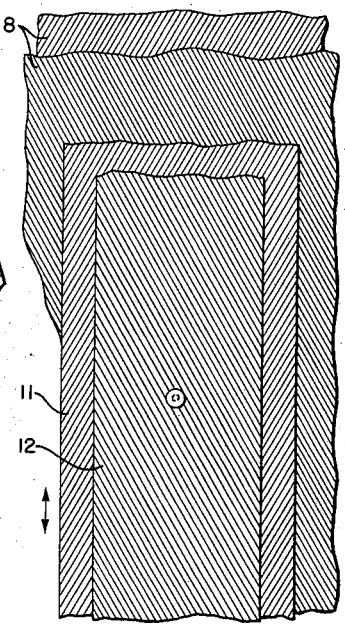
FIG. 4
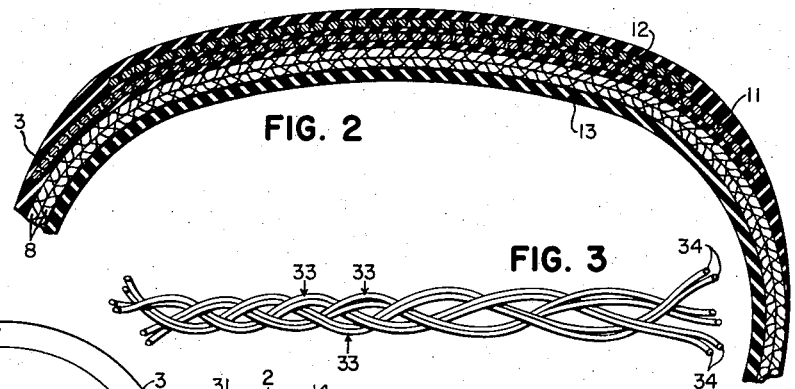
FIG. 2
FIG. 3
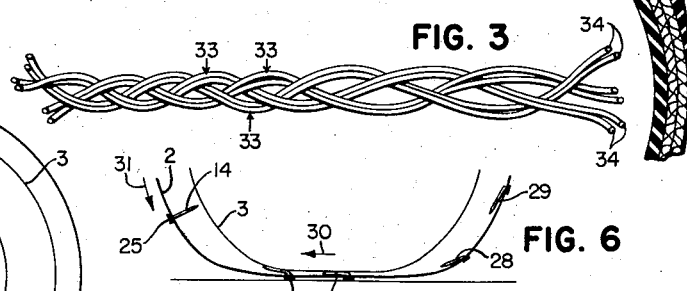
FIG. 6
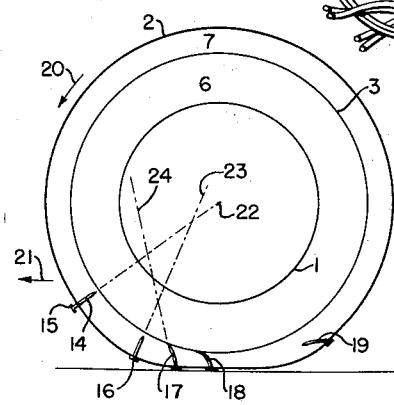
FIG. 5
INVENTOR.
WILLIAM M. SANDERSON
BY
*P. L. Miller*
ATTORNEY

United States Patent Office 3,025,902
Patented Mar. 20, 1962

3,025,902
SAFETY TUBELESS TIRE CONSTRUCTION
William M. Sanderson, Cuyahoga Falls, Ohio, assignor to The Goodyear Tire & Rubber Company, Akron, Ohio, a corporation of Ohio
Filed July 22, 1957, Ser. No. 673,197
11 Claims. (Cl. 152—340)

The present invention relates particularly to a safety tubeless tire construction in which the tubeless tire is provided with two chambers formed by a diaphragm which spans the space between the beads of an open-bellied tire and is of smaller cross-section than the tubeless tire itself so that it divides the air container, formed by the tubeless tire and rim, into two radially disposed air-receiving chambers. The inner air-receiving chamber, which is the reserve chamber, is defined by the wall of the diaphragm and the rim upon which the tire is mounted, while the outer air-receiving chamber is defined by the opposed walls of the tubeless tire and diaphragm.

In a joint application of Sanderson and Eberhard, Serial No. 589,247, filed June 4, 1956, there is disclosed a safety tire of this same general type which is provided with a lubricant to lubricate the walls of the outer chamber when the diaphragm runs on the inner wall of the tubeless tire after deflation of the outer chamber either because of a blowout or a puncture. The present invention relates to a safety tire of that type.

One object of this invention is to provide an improved safety tire of the type disclosed in which the diaphragm is armored to resist puncturing of the diaphragm when puncturing objects pass through the tire. While puncturing of tires is becoming less frequent, the possibility must still be considered and while certain types of puncturing objects, if they do pass through the tire, would not cause material damage to the diaphragm, others may if the diaphragm is not properly protected and any improvement that reduces the chance of diaphragm failure is therefore important, as it may save a life.

Another object of this invention is to provide the diaphragm with an armored layer that is preferably highly flexible and which not only resists damage by puncturing objects that may penetrate the tire but also tends to deflect the object to such a position that it cannot thereafter cause serious damage to the diaphragm.

Specifically the invention consists in providing an armored layer comprising one or more layers of hardened abrasion-resistant wires which are quite flexible and are preferably made of strands in cabled or woven formation. With such a construction the wires can be made very flexible and yet sufficiently large in cross-section to provide the protective thickness necessary to resist penetration by tire puncturing objects. In the preferred form of the invention at least two layers of such wires are employed and in the completed diaphragm the wires of each layer are close together in substantially parallel relation to each other, preferably at an angle of about 32° to the circumferential centerline of the tire, with the wires in each layer disposed at opposite angles to the circumferential center line. In addition, when using a diaphragm of this type some form of lubricating means should be used to permit the diaphragm to ride on the inner wall of the tire for long periods of time after deflation of the outer chamber. Some lubricants suitable for this purpose are described in the aforesaid application of Sanderson and Eberhard.

In the drawings:
FIG. 1 is a cross-section of a tubeless tire with the safety diaphragm shown in operative position;
FIG. 2 is a cross-section through the tread surface of the diaphragm shown on an enlarged and somewhat exaggerated scale;
FIG. 3 is a plan view of the wire suitable for this invention;
FIG. 4 is a detail view on a reduced scale (about one-half that shown in FIG. 1) showing the arrangement of the fabric layers and the super-posed wire layers;
FIGS. 5 and 6 are schematic views showing the manner in which puncturing objects are bent over into positions such that they will not tend to penetrate the diaphragm.

FIG. 1 of the drawings shows a rim 1 on which is mounted a tubeless tire 2 which is preferably so constructed as to withstand the sidewall flexing during run-flat operation. Nylon cords are preferred. The tire should of course be made air impervious. The diaphragm 3 is provided with channel-shaped extensions 4 which lie between the beaded edges 5 of the tire and the rim 1 whereby the diaphragm is held in place, upon inflation of the tubeless tire, by the air pressure acting to force the beads against the rim flanges and the wedging action between the beads and the rim seats.

The diaphragm divides the air container, formed by the rim and tire, into two air-receiving chambers, namely an inner chamber 6 and an outer chamber 7. The diaphragm as illustrated is shown as being formed with a plurality of layers of rubberized nylon cord fabric 8 which project into the extensions 4. The cords extend from one extension to the other as in the normal tire construction so that when the outer chamber 7 fails the inner chamber will be restrained by the cords so as not to expand excessively. The cords should preferably be of the type having a high tensile strength, high heat resistance and be readily flexible. Nylon cords are preferable because of their great strength and heat resistant qualities. Such a basic construction for a diaphragm is disclosed in the aforesaid application of Sanderson et al. The inner chamber 6 is inflated by means of a valve 9 of any desired construction and the outer chamber 7 is inflated through an all-rubber valve 10 which has a perforation through which air can be supplied to the outer chamber but which perforation is normally closed because the rubber of the valve 10 is under high compression.

In FIGS. 2 and 4, two layers of wires 11 and 12 are shown as armor for the outer surface of the diaphragm. In FIG. 4, it will be noted that the angle of the cords 8 and wires 11 and 12 in successive layers are at opposite angles to each other. In this view it is to be understood that the circumferential direction is shown vertical and that with respect to this circumferential line the preferred angle in both the cord layer and the wire layer is in the order of 32°. The diaphragm is normally made in flat form as disclosed in said application of Sanderson, et al. and the wire layer is applied at this time. Upon expansion of the diaphragm from flat form to arched form as shown in FIG. 1 the cords naturally pantograph and change their angle with respect to the circumferential centerline of the diaphragm. The initial angle for the cords necessary to achieve the resultant angle in the finished product is well understood by those skilled in the art.

It will be noted that the inner layer of wires 11 extend across the outer surface of the diaphragm to a greater extent than the outer layer so that the edges are stepped off to reduce the chances of flex-failure at the terminal edges of the layers. Due to the fact that the ends of the wires are not restrained as are the ends of the cords it is found that upon expansion of the diaphragm from flat form to the form shown in FIG. 1 the wires will pantograph to a greater extent than the cords and, therefore, in order to get the desired resultant angle in the wires upon expansion it is necessary to have them arranged at a greater angle than that of the cords while in the diaphragm is in flat form. In a typical example the cords 8 were arranged at 52° in the flat form while the wires were arranged at 54°. Upon expansion both the cords and the wires assumed an angle of approximately 32° with respect to the circumferential centerline. The angles of the cords and wires need not be the same.

The armored layer on the diaphragm does not interfere with the normal riding qualities of the tire. During the normal operation of the tire the inner diaphragm merely floats inside of the tire itself and is, therefore, not subjected to the working stresses in the tire. This armor, therefore, does not wear out or break down during normal operation but is ready for immediate operation when the outer chamber fails or, as explained later, a puncturing object penetrates the tire. Thus, the tire can be made suitably flexible although the diaphragm may conceivably be stiffer than the tire casing itself. Since it is only designed for emergency use, a slight impairment in the riding qualities during such use is not important. Also, by putting the armor on the diaphragm instead of using a breaker strip in the tire, less material is employed because of the smaller circumferential tread area of the diaphragm.

It is to be noted that the wires in the armor are not under tension during emergency use of the diaphragm, whereas the cords 8 are under tension because the pressure is solely, or at least mainly, within the inner chamber. If the cords 8 were made of wire and reliance was placed on such wires to prevent damage because of puncturing objects, some of the effect that is obtained by this invention might be obtained, but the disadvantage would be that such wires would be under tension and, therefore, break more readily when engaged by a puncturing object. Additionally, such wires if used in the tension resisting layers would prevent growth of the inner chamber after the failure of the outer chamber.

In this invention the diaphragm is preferably provided with cords 8 which have a substantial residual stretch. The cords employed are preferably nylon cords which are made somewhat unstretchable by proper treatment well understood in the art, but which have from 10–20% residual stretch after such treatment, whereby when the outer chamber fails the inner chamber will enlarge but not sufficiently to completely fill the space defined by the tire and rim. Of course, with the enlargement of the inner chamber, there is a drop of pressure in the inner chamber. This is not serious because as the diaphragm travels on the inner tread surface of the tire after failure of the outer chamber, the friction between the walls of the diaphragm and tire and the rapid flexing of the sidewalls of the tire itself, create an increase in the air temperature in the inner chamber and the pressure within the inner chamber soon builds up to a point in the order of what it was under normal riding conditions. At the same time, the greater volume of the inner chamber has at least two effects. In the first place, it reduces the amount of tire deflection and this in turn reduces the amount of flexing of the sidewalls. In the second place the diaphragm expands laterally as well as radially. The result of such expansion is that more or the sidewalls of the diaphragm engage the sidewalls of the tire and the total pressure acting to hold the tire beads against the rim flanges is increased so that the tire is more firmly held on the rim during emergency operation. This is important because it gives greater stability by avoiding excessive lateral sway and it prevents accidental displacement of the tire beads from the rim seats so that there is good rolling contact of the inner diaphragm on the inner tread surface of the tire.

It will be noted that, with the wire armor constructed as described, the diaphragm may expand radially in use because the wires can pantograph the same as when the tire is being built and expanded to the shape illustrated. Therefore, these wires do not interfere with the expansion as would wires that extended all the way across the diaphragm and under the beads as do the cords 8.

As clearly shown in FIG. 2, the inner surface of the diaphragm is coated with a layer of a suitable rubber 13 to the extent necessary to make the diaphragm substantially air impervious so that there will be little or no loss in pressure under emergency operating conditions thus making it unnecessary to stop for emergency repairs for a long period of time. This is more adequately described in the aforesaid application of Sanderson and Eberhard. Again, as in the application of Sanderson and Eberhard, a lubricating means is employed between the outer surface of the diaphragm and the inner surface of the tire, so that in emergency use the amount of heat build-up within the tire is reduced to a point where there is little likelihood that the rubber in the diaphragm will break down and revert to a soft sticky state which would increase the friction and soon result in a failure of the diaphragm. A suitable high-abrasion resistant rubber should be employed at least at the outer surface of the diaphragm.

FIGS. 5 and 6 illustrate the manner in which one type of puncturing object is acted upon by the armor. These figures are more or less schematic and illustrate what takes place when a tire is in operation and has a puncturing object in the carcass of the tire itself. For the purpose of illustration, a simple puncturing object such as a nail 14 is used, which as shown in FIG. 1 has not entirely penetrated the tire to the head of the nail, but the pointed end thereof is at a position substantially at the outer surface of the diaphragm. As this nail is driven further into the tire, there is always the possibility that it will puncture the diaphragm. Under normal operation the air pressure in the chambers 6 and 7 is substantially the same and the diaphragm may be deflected by the nail 14 to some extent without danger of the nail penetrating the diaphragm. However, even though the air pressure is the same in chambers 6 and 7, the diaphragm is acted upon by centrifugal force and the diaphragm is forced radially outwardly toward the nail and the wire armor tends to resist penetration of the nail through the diaphragm. The armor also has another purpose even under conditions where the pressure in the outer chamber is still intact, namely to bend the nail so that it will not be in a position to penetrate the diaphragm.

For the purposes of this description, it is assumed that the nail penetrates radially at the center of the tread as in FIG. 1 and, as illustrated in FIG. 5, the nail is shown in five different positions, 15, 16, 17, 18 and 19. The inner and outer chambers 6 and 7 are illustrated diagrammatically. The tire is rotating in the direction of the arrow 20 and the vehicle is traveling in the direction of the arrow 21. The axis of rotation of the tire is at the point 22 and the nail 14 at the position 15 points directly at this axis of rotation (see dot-dash line). As the nail moves to the position 16, the tread surface of the tire starts to flatten out as is normal for pneumatic tires. This action is started when the nail is at position 16, and, since the nail is held rather firmly in the body of the tread, the nail is deflected so that, as illustrated by the dot-dash line 23, the nail is no longer pointing at the center of the axis of rotation. In the flattened portion of the tread when the nail is at the position 17 this deflection becomes more pronounced as illustrated by the dot-dash line 24. At this particular time the space between the diaphragm and the tread becomes less and due to centrifugal action acting on the diaphragm the armor on the outer surface of the diaphragm acts like a hammer to bend the nail which is no longer extending radially, and this action is increased at the mid-position 18 so that the nail is deflected from a radial position as at position 15, to a non-radial position such as at position 19. It will be understood that this action takes place during normal operation with both chambers inflated.

The action in bending the nail is increased by the fact that the tread of the tire is foreshortened circumferentially at the points of contact with the ground, but the diaphragm is not foreshortened and, therefore, there is some small amount of relative angular movement between a point on the diaphragm and a corresponding point on the tread radially outward therefrom. This has a tendency to bend the nail the same as when a nail is struck with a glancing blow by a hammer. This relative angular movement is in the direction in which the nails are bent as shown in FIG. 5.

This bending action is probably not quite as clear in FIG. 5 as it is in FIG. 6, which shows the action that takes place when the outer chamber loses its air pressure and the diaphragm rides on the inner surface of the tire. Here again is shown a series of positions 25, 26, 27, 28 and 29 for the nail 14. It will be assumed that sometime after the nail punctures the outer chamber the air is lost from the outer chamber and it collapses so that the diaphragm rides on the inner thread surface of the tire. Since the circumferential dimension of the tire tread is greater than the circumferential dimension of the diaphragm and, since both the diaphragm and tire must rotate together, it is obvious that there must be a circumferential sliding action between the engaging portions of the tire and diaphragm. This sliding action of the diaphragm on the tire is in the direction of the arrow 30 which is opposite to the direction of rotation of the tire as illustrated by the arrow 31. This relative sliding action, therefore, bends the nail and practically clinches the nail against the inner surface of the tire.

If the puncturing object which causes deflation of the outer chamber happens to be frangible material such as glass, pottery or the like, or if the material is readily abraded, the wire armor will tend to abrade or break down the material so that it may ultimately disappear. As will be noted in connection with the illustration in FIG. 6 the nails have been bent over into such a position that they are no longer a major threat to the safe operation of the tire under emergency conditions. Of course, there will be some rubbing action of the nails against the surface rubber covering the wire, and portions of this rubber may be removed as a result. However, the imperviousness of the diaphragm is not disturbed because the cords 8 remain intact and the sealing layer 13 is not damaged. Any surface rubber that may be removed by the nails can be replaced when the diaphragm is removed for repair.

Of course, this construction will not cover all possible conditions where puncturing objects pass through the tire and there may be some instances where, regardless of this invention, the diaphragm may be penetrated by a tire puncturing object, but in tests that have been run with diaphragms made according to this invention it has been found that the possibility of diaphragm failure has been greatly reduced. A railroad spike that might penetrate the outer tire could not very well be bent over in the same manner as a small nail but its presence in the tire would be readily detected by a motorist and he could stop and remove the spike before the diaphragm could be damaged enough to permit penetration of the spike therethrough. Frequently, objects of this nature, after they have been picked up, are thrown out of the tire by centrifugal force. The hammering action of the armor against the object will assist this action. This invention may not necessarily provide 100% protection, but it greatly reduces the hazard of punctures due to puncturing objects.

With all of this armoring the diaphragm still remains flexible so as to provide for smooth-running emergency operation. Furthermore, since the diaphragm expands laterally as well as radially after failure of the outer chamber, the tread area on the diaphragm is increased and, therefore, the deflection of the tire itself is minimized because of the enlargement of the larger area of the diaphragm in contact with the inner surface of the tire.

In operation, when the tire is punctured by an object, if the object is long enough it may be bent to a position where it no longer becomes a major threat against continued operation of the tire either during normal operation or emergency operation. The wire armor, being separate from the cord or strength layers, is not under tension and is not apt to snap when engaged by a puncturing object. The high abrasive action of the wires is enhanced by having the wires extending at an angle to the center line. The enlargement of the inner chamber after deflation of the outer chamber tends to stabilize the tire, prevent excess deflection of the tire at its tread surface and increase the stability of the tire. The armor also tends to eject relatively blunt non-bendable objects when they penetrate the tire.

In a test run of a tire constructed according to this invention, sixteen nails were driven through the tire tread at different points circumferentially of the tire and at different positions laterally thereof, so that there were nails extending through the tire at the shoulders as well as at the center thereof. This tire was operated on an automobile at speeds of from 50 to 60 m.p.h. with occasional speeds up to 95 m.p.h. and continued operating satisfactorily for over 50 miles without diaphragm failure.

The widthwise extent of the wire layers as shown in FIG. 2 is just by way of example, it being understood that these layers may extend laterally to a greater or lesser extent and even down onto the sidewalls thereof if it is found desirable or necessary to protect the diaphragm in these areas. While one layer of wires, in closely spaced relation to each other, may be found to be satisfactory, it is preferable to use two layers with the wires running at opposite angles as shown.

In FIG. 1 there is illustrated a layer of a liquid and/or a solid lubricant 32 or a rubber containing such a lubricant which covers the outer surface of the diaphragm. This may be any suitable lubricant satisfactory for this purpose, but preferably one that will not break down under normal or emergency operating conditions and should be of a type that is not compatible with the rubber in the tire or diaphragm because it would tend to be absorbed by the rubber and thus lose its effectiveness.

The wires are each preferably of a stranded construction such as illustrated in FIG. 3 which shows three strands 33, each composed of two filaments 34, braided together. By using the smaller filaments a greater flexibility is obtained without impairing the desirable hard abrasive resisting characteristics of the filaments or the wire as a whole. A solid wire of the desired diameter might prove too stiff for satisfactory operation. Parallel wires are fed through a calender and coated with rubber thereby to make a wire fabric which is then cut on the bias as is common practice in cord fabric manufacture.

While it has been explained that the armor is applied while the diaphragm is in flat form as in normal tire building operation and will expand readily when the diaphragm is expanded into shape, the invention is not limited to so constructing the diaphragm and the armor may be added after the diaphragm is expanded. One advantage of such a method is that it is possible to arrange the wires closer together than they probably could be if the breaker strip was applied while the diaphragm is in flat form as the wires tend to separate when the diaphragm expands.

While certain representative embodiments and details have been shown for the purpose of illustrating the invention, it will be apparent to those skilled in the art that various changes and modifications may be made therein without departing from the spirit or scope of the invention.

Having thus fully described by invention, what I claim and desire to secure by Letters Patent of the United States is:

1. In combination, an open-bellied tubeless tire, a rim on which said tire is mounted to form therewith an air container, a relatively thin flexible annular diaphragm of inverted U-shape in cross-section having the lateral edges thereof anchored securely to the axially spaced side walls of the container in air tight sealed relation therewith, said diaphragm when distended but unstressed having a normal outer diameter substantially greater than that of the rim and substantially less than the inner diameter of said tire at the tread area thereof to thus divide the container into radially disposed inner and outer chambers, and means for inflating said chambers, said diaphragm being substantially air impervious to retain the air in said inner chamber when the outer chamber fails and incorporating material having sufficient stretch to permit limited expansion of the diaphragm to materially increase the volume of the inner chamber when the outer chamber is deflated, and said diaphragm including at the outer circumferential tread area thereof a circumferentially stretchable armor having substantially greater cut and abrasion resistance than the adjacent portions of the diaphragm in the tread area thereof.

2. The combination set forth in claim 1 in which the said material incorporated in said diaphragm comprises restraining elements having inherent permissible stretch of from 10% to 20% when the outer chamber is deflated, but which do not have sufficient stretch to permit the inner chamber to enlarge to the normal volume of said air container.

3. The combination as set forth in claim 1 in which a lubricant is provided between the opposed surfaces of the outer circumference of the diaphragm and the inner circumferential surface of the tire adjacent the tread area.

4. The combination as set forth in claim 1 in which said armor comprises longitudinally inextensible wires arranged transversely to the circumferential center line of the diaphragm at substantial angles thereto.

5. The combination as set forth in claim 4 in which some of the wires are arranged at opposite angles to others of said wires.

6. The combination as set forth in claim 4 in which the wires are arranged in at least two layers bonded together by rubber arranged between the layers, with the wires of each layer extending at the same angle but at angles opposite to the angles of the wires in the other layer.

7. The combination as set forth in claim 4 in which the wires are individual wires terminating near the lateral shoulders of the diaphragm.

8. The combination as set forth in claim 4 in which the wires are individual wires closely spaced with respect to adjacent wires and bonded together by a layer of rubber in the tread area, said wires extending only to the lateral shoulders of the tread area of the diaphragm.

9. The combination as set forth in claim 4 in which the wires are each composed of strands.

10. A safety tire comprising an open-bellied tubeless tire, a rim on which said tire is mounted to form therewith an annular air compartment, an annular diaphragm of inverted U-shaped cross-section comprising a relatively flexible body layer of rubber having the lateral edges thereof releasably sealed to the opposite axially spaced inner walls of said compartment to divide said compartment into radially disposed inner and outer air chambers, and means for inflating said chambers, said diaphragm when distended having a normal unstressed outer circumference less than the inner circumference of said tire at the tread area thereof and greater than the outer circumference of said rim and being substantially air impervious to retain the air in said inner compartment when the outer compartment fails and incorporating materials limiting its expansion, under normal operating conditions in which both chambers are inflated to operational pressures, to a circumferential dimension that is substantially less than the inner circumference of said tire at the tread area to thus prevent any appreciable contact of said diaphragm and inner surface of the tire at the tread area under normal operating conditions, said diaphragm at the outer circumference thereof being provided with an integral armored layer of substantially greater cut and abrasion resistance than said body layer to provide means which under normal operating conditions will bend or abrade many puncturing objects which pierce the tire sufficiently to engage the diaphragm, whereby the air imperviousness of said inner air chamber is preserved for emergency operation when the outer chamber is deflated 11. A safety tire as set forth in claim 10 in which said armor comprises closely spaced wires arranged generally parallel to each other and extending at a substantial angle to the circumferential center line of the diaphragm and being bonded to said diaphragm with the ends thereof terminating short of the side walls of said compartment whereby the wires are not subjected to any substantially longitudinal stress due to the inflation pressure in said inner chamber.

References Cited in the file of this patent

UNITED STATES PATENTS

| | | |
|---|---|---|
| 1,297,408 | Schuster | Mar. 18, 1919 |
| 1,633,963 | Weigel | June 28, 1927 |
| 2,045,341 | Bourdon | June 23, 1936 |
| 2,200,916 | Crowley | May 14, 1940 |
| 2,554,815 | Church | May 29, 1951 |
| 2,598,033 | Bourdon | May 27, 1952 |
| 2,679,088 | Meherg et al. | May 25, 1954 |
| 2,680,463 | Khalil | June 8, 1954 |
| 2,786,507 | Howe et al. | Mar. 26, 1957 |
| 2,811,189 | Howard | Oct. 29, 1957 |

FOREIGN PATENTS

| | | |
|---|---|---|
| 615,076 | Great Britain | Dec. 31, 1948 |

OTHER REFERENCES

Two Chamber Safety Tire, from Goodyear, Tires and T.B.A. Merchandising, June 1956, page 47.